(12) United States Patent
Pal et al.

(10) Patent No.: US 10,333,364 B2
(45) Date of Patent: Jun. 25, 2019

(54) SLOT INSULATION FOR ELECTRICAL MACHINES

(71) Applicant: Hamilton Sundstrand Corporation, Charlotte, NC (US)

(72) Inventors: Debabrata Pal, Hoffman Estates, IL (US); Craig R. Legros, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 353 days.

(21) Appl. No.: 14/791,987

(22) Filed: Jul. 6, 2015

(65) Prior Publication Data

US 2017/0012485 A1 Jan. 12, 2017

(51) Int. Cl.
*H02K 3/34* (2006.01)
*H02K 9/22* (2006.01)
*H02K 3/38* (2006.01)
*H02K 3/487* (2006.01)
*H02K 3/32* (2006.01)

(52) U.S. Cl.
CPC .............. *H02K 3/345* (2013.01); *H02K 3/38* (2013.01); *H02K 9/22* (2013.01); *H02K 3/32* (2013.01); *H02K 3/34* (2013.01); *H02K 3/487* (2013.01)

(58) Field of Classification Search
CPC ............ H02K 3/32; H02K 3/34; H02K 3/345; H02K 3/38; H02K 3/46; H02K 3/48; H02K 3/487; H02K 9/22
USPC ................................................ 310/214, 215
See application file for complete search history.

(56) References Cited

U.S. PATENT DOCUMENTS 3,109,947 A 11/1963 Thompson et al.
RE28,705 E 2/1976 Hoffmeyer
(Continued)

FOREIGN PATENT DOCUMENTS

DE 102007004562 A1 7/2008
DE 102008033601 A1 1/2010
(Continued)

OTHER PUBLICATIONS

Extended European Search Report, issued in corresponding European Patent Application No. EP 16177924.4, dated Nov. 11, 2016.
(Continued)

*Primary Examiner* — Bernard Rojas
*Assistant Examiner* — Rashad H Johnson
(74) *Attorney, Agent, or Firm* — Locke Lord LLP; Scott D. Wofsy; Joshua L. Jones (57) ABSTRACT

An electrical machine includes a winding core with a plurality of end slots. A winding is seated in the end slots with end windings where the winding crosses from end slot to end slot. A slot insulator is seated in two of the end slots. The slot insulator includes a first slot liner seated in a first one of the two end slots with a winding slot defined therethrough in an axial direction. A second slot liner is seated in a second one of the two end slots with a winding slot defined therethrough in the axial direction, wherein the second slot liner is spaced apart in a lateral direction relative to the axial direction from the first slot liner by a gap. The slot insulator includes a span portion bridging across the gap to connect the first and second slot liners.

2 Claims, 11 Drawing Sheets

(56) References Cited

U.S. PATENT DOCUMENTS

| | | | |
|---|---|---|---|
| 6,124,660 A * | 9/2000 | Umeda | H02K 1/243 |
| | | | 310/201 |
| 6,509,665 B1 | 1/2003 | Nishiyama et al. | |
| 8,143,759 B2 | 3/2012 | Allen et al. | |
| 2002/0047457 A1* | 4/2002 | Yoshikawa | H02K 3/345 |
| | | | 310/215 |
| 2009/0096313 A1* | 4/2009 | Harada | H02K 3/522 |
| | | | 310/201 |
| 2009/0102311 A1* | 4/2009 | Kotani | H02K 3/345 |
| | | | 310/215 |
| 2012/0080976 A1* | 4/2012 | Oka | H02K 3/522 |
| | | | 310/215 |
| 2012/0242176 A1 | 9/2012 | Pal | |
| 2013/0140936 A1* | 6/2013 | Lin | H02K 3/325 |
| | | | 310/215 |
| 2013/0207395 A1 | 8/2013 | Huang et al. | |
| 2015/0048711 A1* | 2/2015 | Hino | H02K 3/325 |
| | | | 310/215 |
| 2015/0061452 A1* | 3/2015 | Nakatake | H02K 3/325 |
| | | | 310/214 |

FOREIGN PATENT DOCUMENTS

| | | |
|---|---|---|
| GB | 2493659 A | 2/2013 |
| WO | 2015/083470 A1 | 6/2015 |

OTHER PUBLICATIONS

European Communication pursuant to Article 94(3) EPC, dated Nov. 9, 2018, issued during the prosecution of corresponding European Patent Application No. 16177924.4 (7 pages).

\* cited by examiner

SLOT INSULATION FOR ELECTRICAL MACHINES

BACKGROUND OF THE INVENTION

1. Field of the Invention

The present disclosure relates to electrical machines, and more particularly to slot insulation such as used in electric motors, generators and generator/motors.

2. Description of Related Art

A variety of devices and methods are known in the art for supporting electrical machine end windings, and for transferring heat from end windings. For example, heat resistant papers can be used to insulate end windings from each other and/or from the core supporting the windings. One common method of cooling the end windings is air cooling, for example, where flowing air impinges on resin impregnated end windings. A typical failure mode for air cooled end windings is for the windings to fail at the location where the windings exit the slot of the core, e.g., the stator slot. These typical failures are caused by loss of insulation between the winding and the core.

Such conventional methods and systems have generally been considered satisfactory for their intended purpose. However, there is still a need in the art for improved slot insulation for electrical machines. The present disclosure provides a solution for this need.

SUMMARY OF THE INVENTION

An electrical machine includes a winding core with a plurality of end slots. A winding is seated in the end slots with end windings where the winding crosses from end slot to end slot. A slot insulator is seated in two of the end slots. The slot insulator includes a first slot liner seated in a first one of the two end slots with a winding slot defined therethrough in an axial direction. One of the end windings enters the first one of the end slots through the winding slot of the first slot liner. A second slot liner is seated in a second one of the two end slots with a winding slot defined therethrough in the axial direction, wherein the second slot liner is spaced apart in a lateral direction relative to the axial direction from the first slot liner by a gap. One of the end windings exits the second one of the end slots through the winding slot of the second slot liner. The slot insulator includes a span portion bridging across the gap to connect the first and second slot liners.

The end winding can be in intimate contact with the span portion for heat removal from the end winding. The span portion can be contoured. For example, the span portion can include a curved surface that curves in a direction around an axis perpendicular to the axial direction and to the lateral direction. Each of the first and second slot liners can define a complete perimeter surrounding the respective winding slot, insulating the end winding from the winding core. The two end slots in which the slot insulator is seated can be two adjacent slots of the plurality of end slots. The first and second slot liners and the span portion can be a unitary structure including at least one of polyetherimide, PEEK, aluminum nitride based composite materials, aluminum oxide based composite materials, boron nitride based composite materials, any other suitable type ceramic based composite material, or any other suitable materials in general. It is also contemplated that the span portion can include a material different than that of the first and second slot liners, wherein the material of the span portion has a higher thermal conductivity than that of the first and second slot liners.

The winding can be concentric wound and the end winding entering the first one of the end slots can be the same as the end winding exiting the second one of the end slots. It is also contemplated that the winding can be lap wound.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
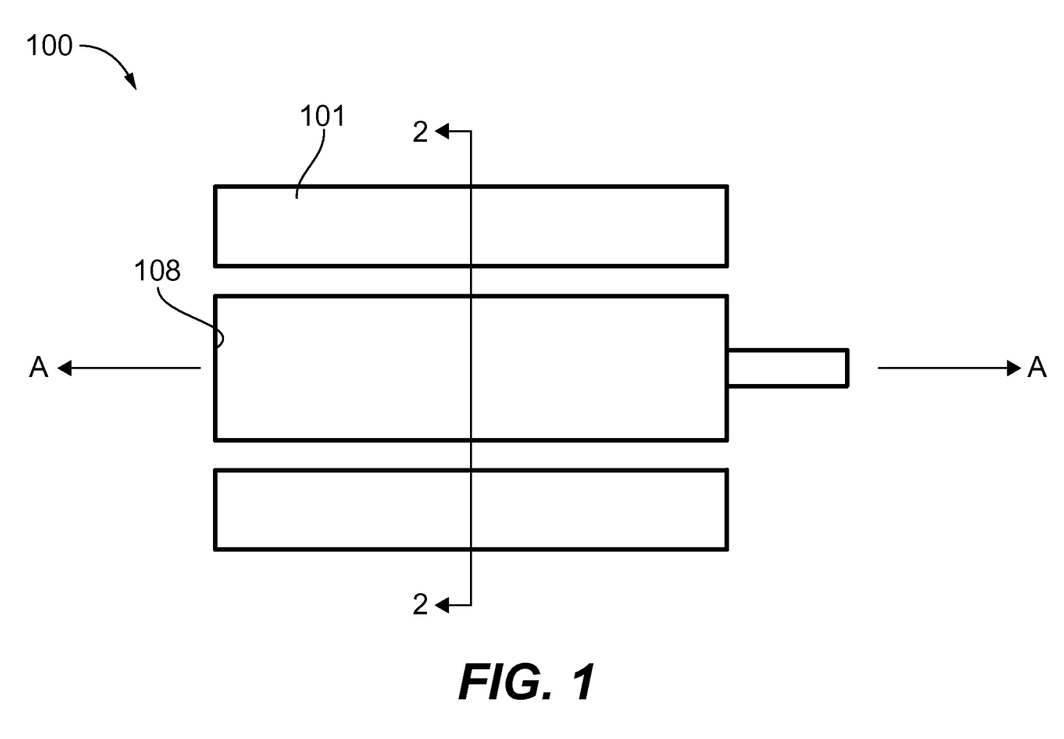
FIG. 1 is a schematic cross-sectional side elevation view of an exemplary embodiment of an electrical machine constructed in accordance with the present disclosure, showing the stator and rotor.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIGS. 2-10, as will be described. The systems and methods described herein can be used improve electrical insulation and heat transfer for end windings for longer service life in electrical machines such as motors, generators, and electrical machines that are used as motors and generators, such as starter motor/generators for gas turbine engines.

Figure 2:
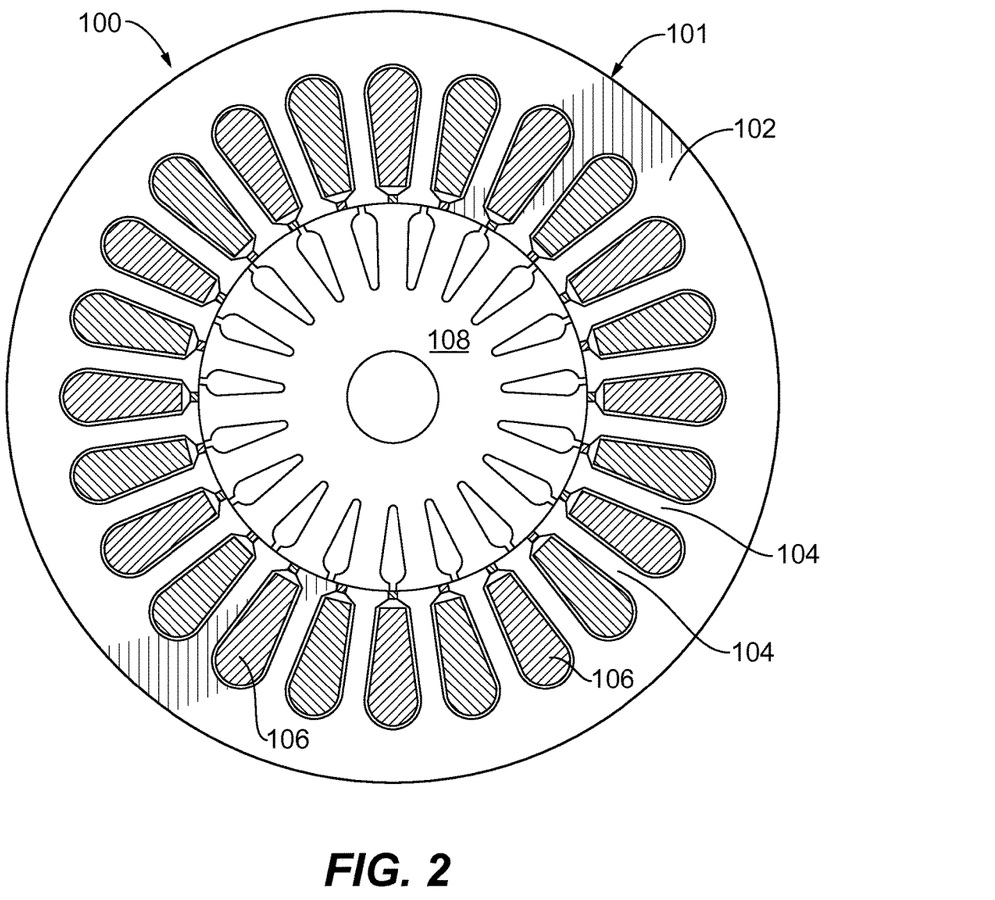
FIG. 2 is a cross-sectional end elevation view of the electric machine of FIG. 1, showing the stator core slots.

Electrical machine 100 includes a stator 101 and a rotor 108. Stator 101 includes a winding core, namely stator core 102 and winding 106, as shown in FIG. 2. Core 102 includes a plurality of end slots defined between adjacent core arms 104, i.e., the slots occupied by windings 106 in FIG. 2. Winding 106 is seated in the end slots with end windings 112, labeled in FIGS. 5 and 6, protruding from each end of core 102 beyond the end slots, where the winding 106 crosses from end slot to end slot.

Figure 3:
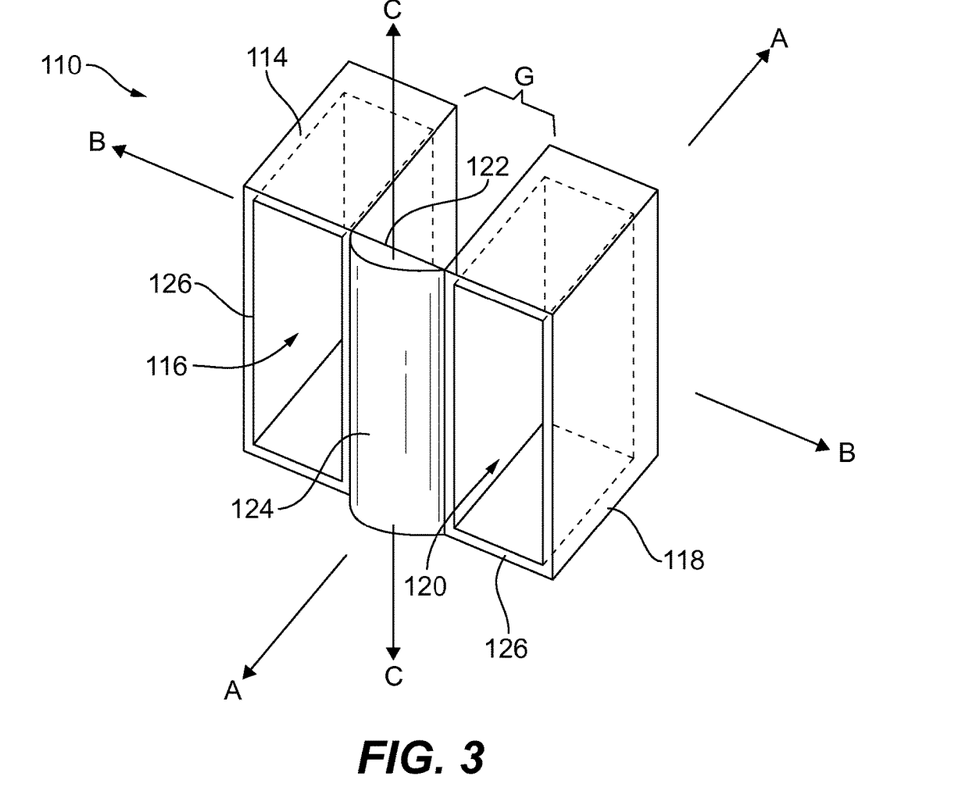
FIG. 3 is a perspective view of an exemplary embodiment of an end slot insulator constructed in accordance with the present disclosure, showing the first and second slot liners spaced apart across a gap and connected by the span portion.
Figure 4:
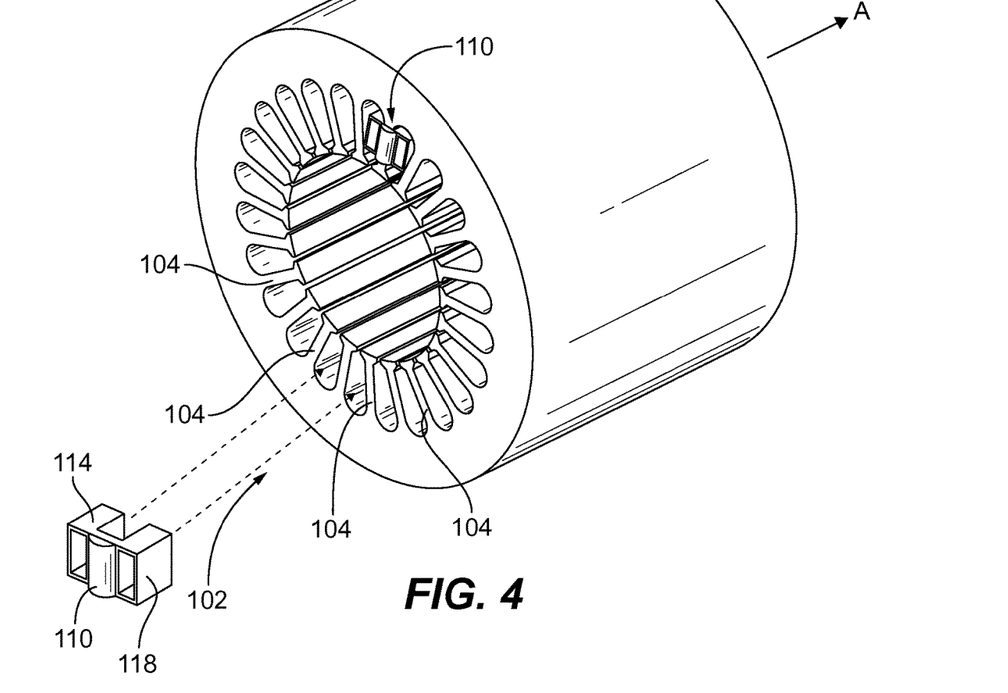
FIG. 4 is an exploded perspective view of a portion of the electrical machine of FIG. 1, indicating the positions for seating the end slot insulators on the end slots of the stator core.

With reference to FIGS. 3 and 4, a slot insulator 110 is seated in two of the end slots. FIG. 3 shows the slot insulator 110 in isolation, which includes a first slot liner 114 seated in a first one of the two end slots, as indicated by the corresponding dashed in FIG. 4. A winding slot 116 is defined through slot liner 114 in an axial direction A. One of the end windings 112, e.g., end winding 112a in FIG. 6, enters the first one of the end slots through the winding slot 116 of the first slot liner. A second slot liner 118 is seated in a second one of the two end slots, as indicated by the corresponding dashed line in FIG. 4. A winding slot 120 is defined through slot liner 118 in the axial direction A.

Figure 5:
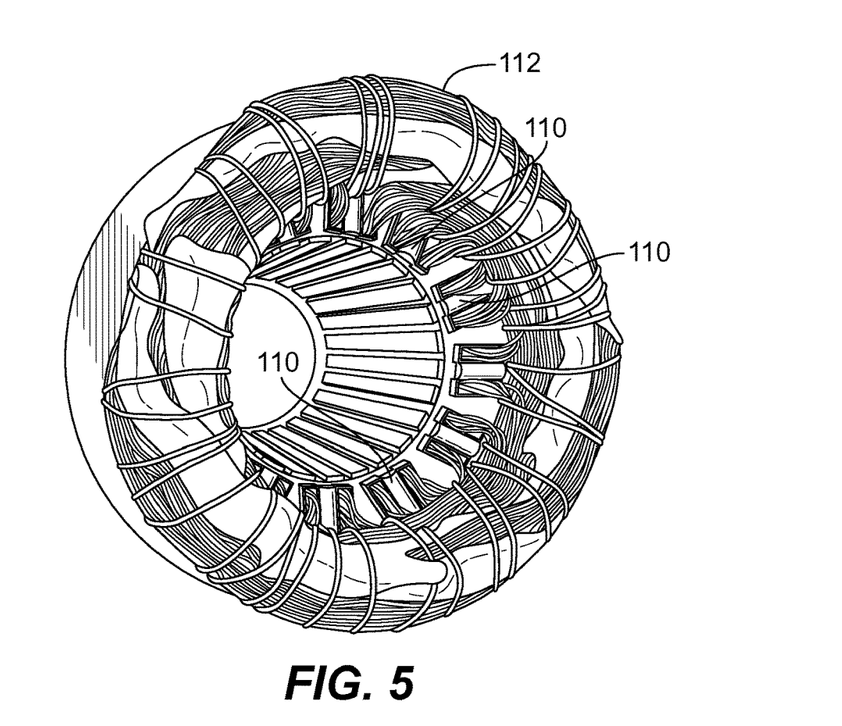
FIG. 5 is a perspective view of a portion of the electrical machine of FIG. 1, showing the stator core, end slot insulators, and end windings.
Figure 6:
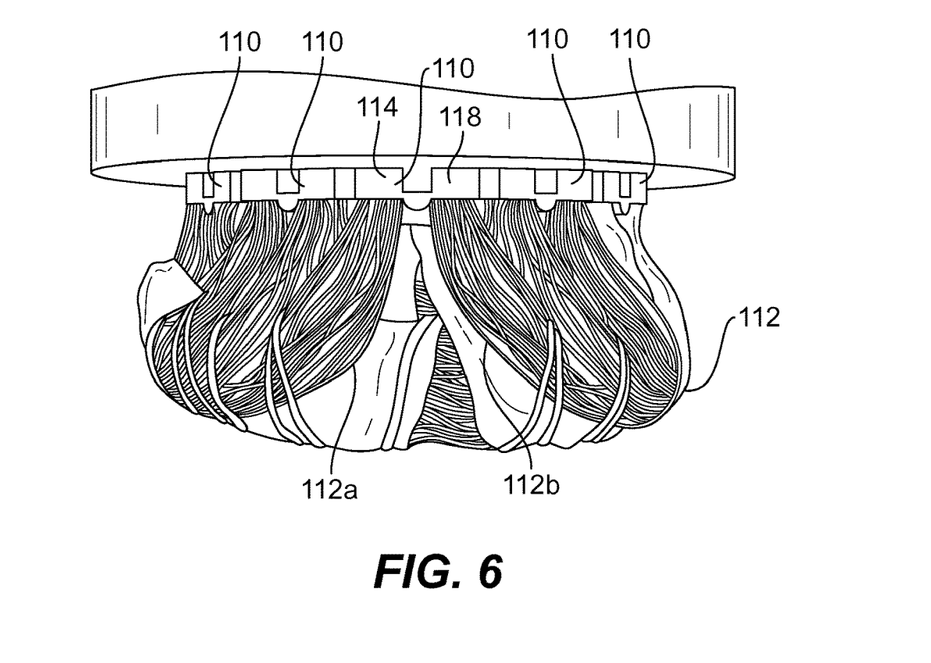
FIG. 6 is a perspective view of a portion of the stator core, end slot insulators, and end windings of FIG. 5.

With continued reference to FIG. 3, the second slot liner 118 is spaced apart in a lateral direction B relative to the axial direction A from the first slot liner by a gap G. One of the end windings 112, e.g., end winding 112b in FIG. 6, exits the second one of the end slots through the winding slot 120 of the second slot liner 118. Each of the first and second slot liners 114 and 118 defines a complete perimeter 126 surrounding the respective winding slot 116 and 120, insulating the end windings 112 from the core 102. Slot insulators 110 are seated in each end slot of core 102, wherein each slot insulator 110 is seated in two adjacent slots, as shown in FIGS. 5 and 6. Specifically, each slot liner 114 is seated in an end slot next to the respective slot liner 118 of the same slot insulator 110, where gap G is occupied with a respective core arm 104, as indicated in FIG. 4.

Slot insulator 110 includes a span portion 122 bridging across the gap G to connect the first and second slot liners 114 and 118. Span portion 122 is optionally contoured. For example, as shown in FIG. 3, span portion 122 includes a curved surface 124 that curves in a direction around an axis C perpendicular to the axial direction A and to the lateral direction B.

Figure 7:
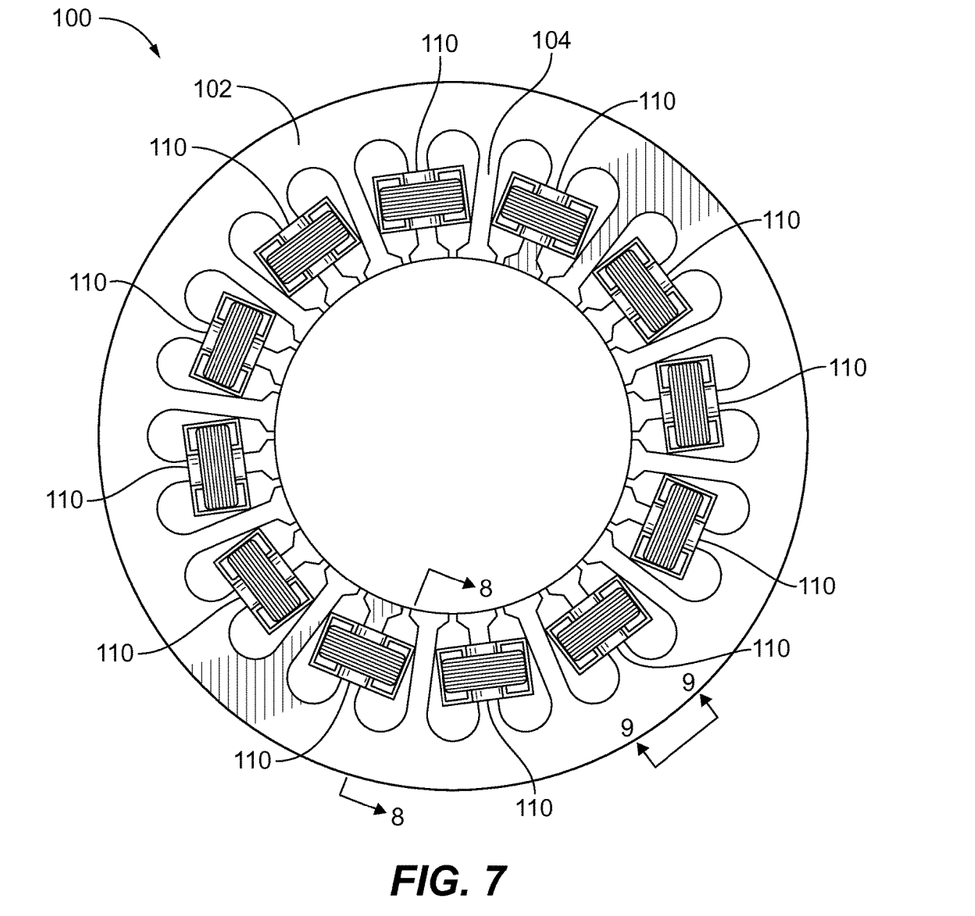
FIG. 7 is an end view of a portion of the electrical machine of FIG. 1, showing an exemplary embodiment of the winding that is concentric wound.
Figure 8:
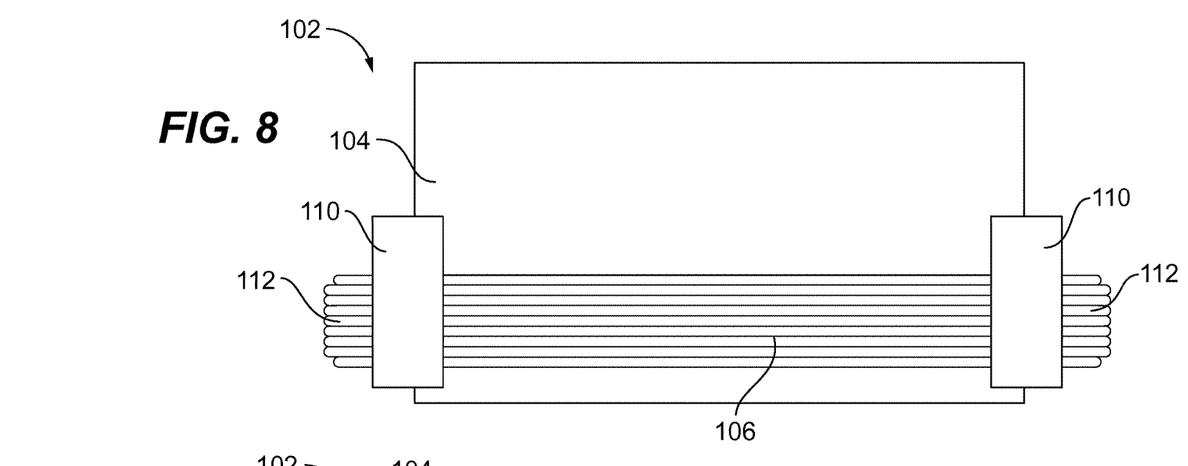
FIG. 8 is a schematic radial cross-sectional view of a portion of the stator core of FIG. 7, showing winding passing through slot insulators on each end of the stator core.
Figure 9:
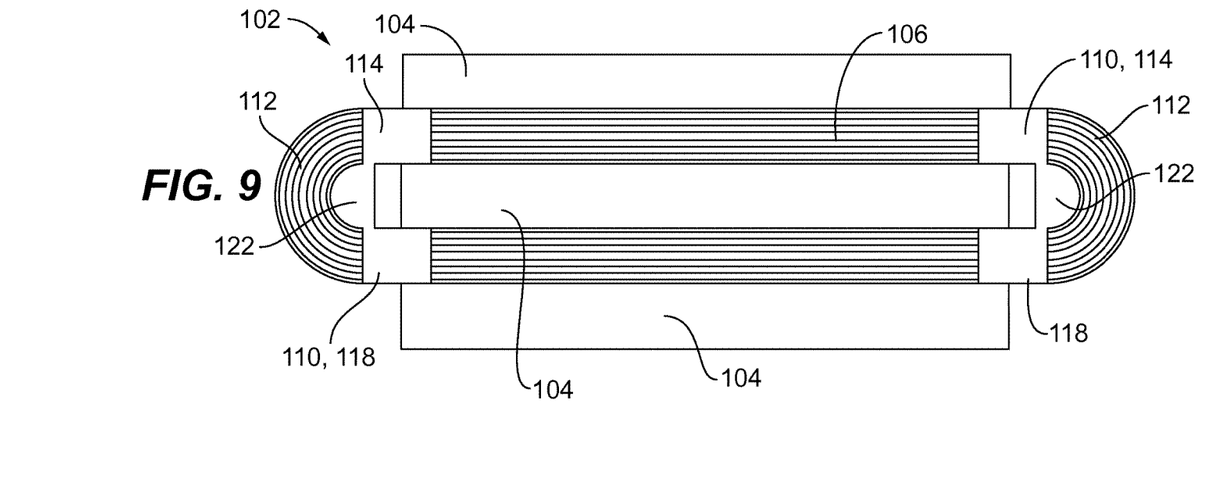
FIG. 9 is a schematic circumferential cross-sectional view of the stator core of FIG. 8, showing the concentric wound winding.
Figure 10:
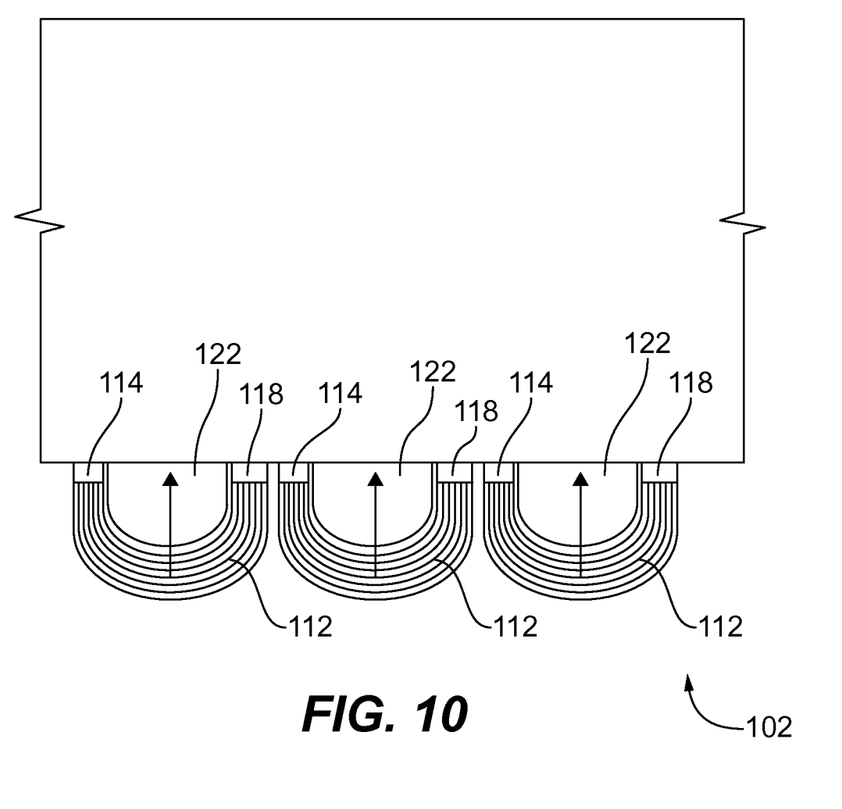
FIG. 10 is a schematic view of a portion of the electrical machine of FIG. 7, schematically showing the heat transfer from the end windings, through the slot insulator, and into the core.

Winding 106 as shown in FIGS. 5 and 6 has a lap wound configuration. With reference now to FIG. 7, it is also contemplated that concentric wound winding configurations can be used. In FIG. 7, end windings 112 are shown in a concentric wound configuration, where each end winding 112 is supported by a respective slot insulator 110 seated the end slots of core 102 as described above. FIG. 8 shows a radial schematic view of winding 106 with its end winding 112 supported on opposed ends of core 102 by respective slot insulators 110. FIG. 9 shows the same winding 106 viewed inward along the radius of core 102. The end windings 112 are in intimate contact with the span portion 122, due to the contoured surface 124 labeled in FIG. 3, for heat removal from each end winding 122. This heat removal is indicated schematically in FIG. 10 by the large arrows.

It is contemplated that first and second slot liners 114 and 118 and the span portion 122 can be a rigid, unitary structure including any suitable material such as polyetherimide, e.g., ULTEM polymers available from SABIC of Riyadh, Saudi Arabia, polyether ether ketone (PEEK), aluminum nitride based composite materials, aluminum oxide based composite materials, boron nitride based composite materials, any other suitable type ceramic based composite material, or any other suitable materials in general. It is also contemplated that the span portion 122 can include a material different than that of the first and second slot liners 114 and 118, wherein the material of the span portion 122 has a higher thermal conductivity than that of the first and second slot liners 114 and 118 to facilitate heat removal from end windings 112, through slot span portions 122, and into arms 104 of core 102. Slot insulators 110 can be seated in core 102 prior to winding. In both lap wound and concentric wound configurations, the windings 106 hold slot insulators 110 in place after winding.

Figure 11:
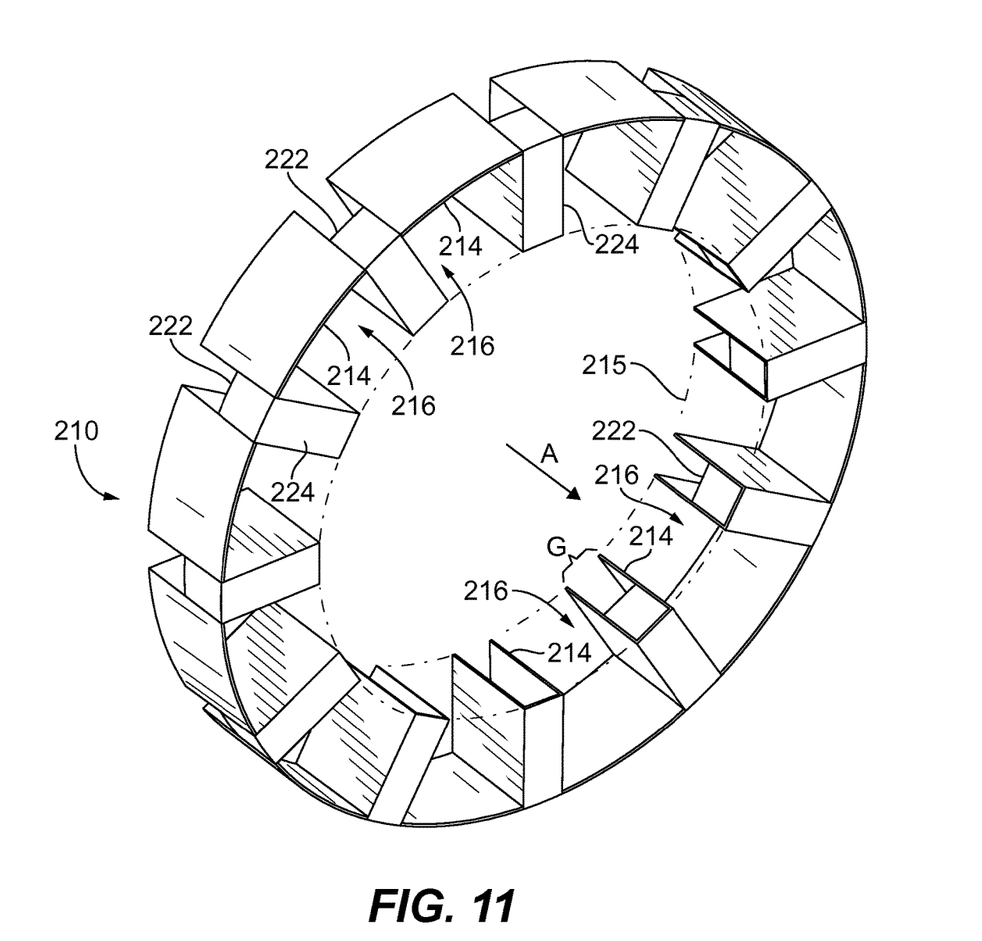
FIG. 11 is a perspective view of another exemplary embodiment of an end slot insulator constructed in accordance with the present disclosure, showing a ring of circumferentially spaced slot liners, spaced apart across respective gaps and connected by respective span portions.
Figure 12:
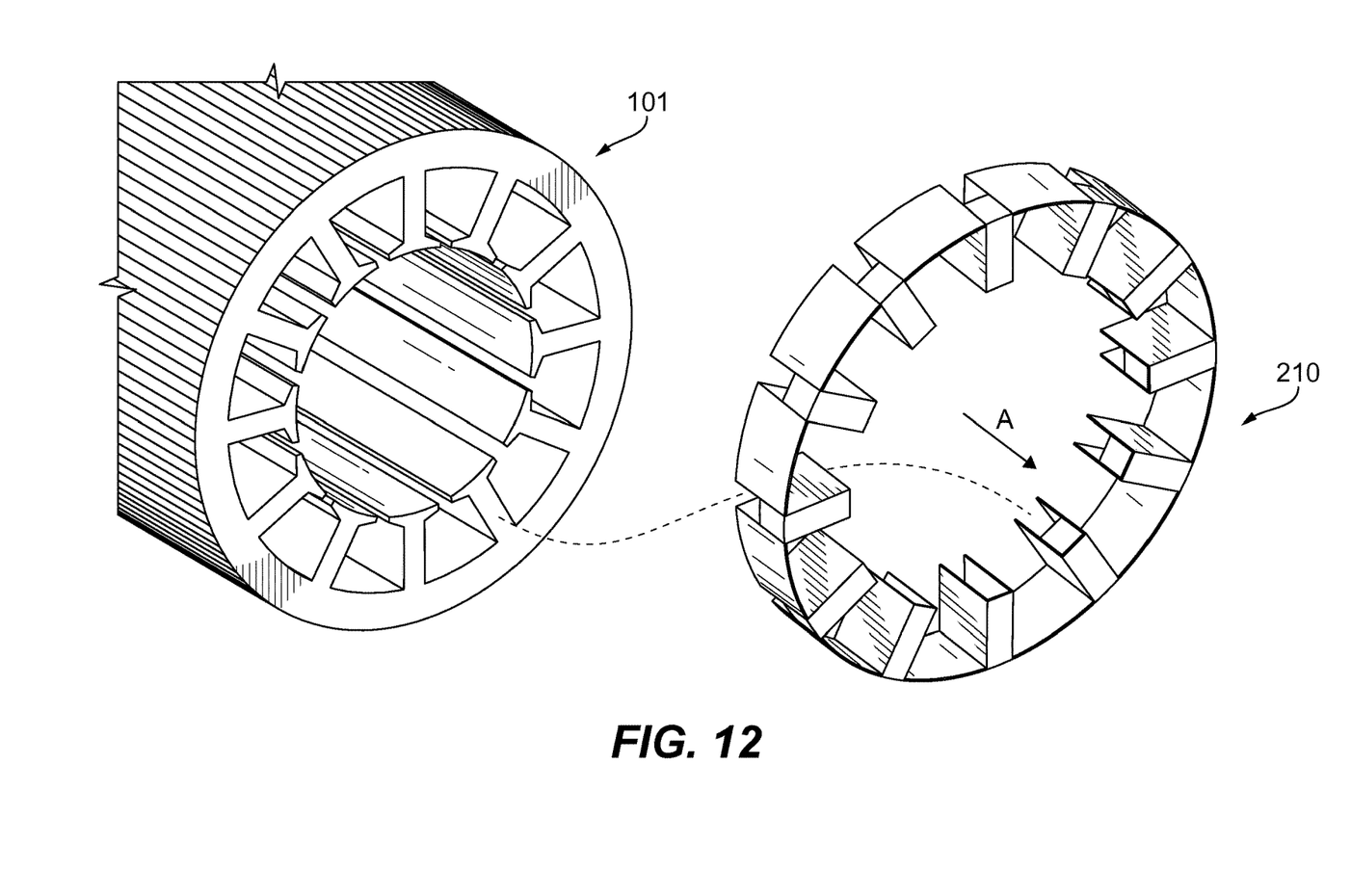
FIG. 12 is an exploded perspective view of the end slot insulator of FIG. 11 and a stator core.
Figure 13:
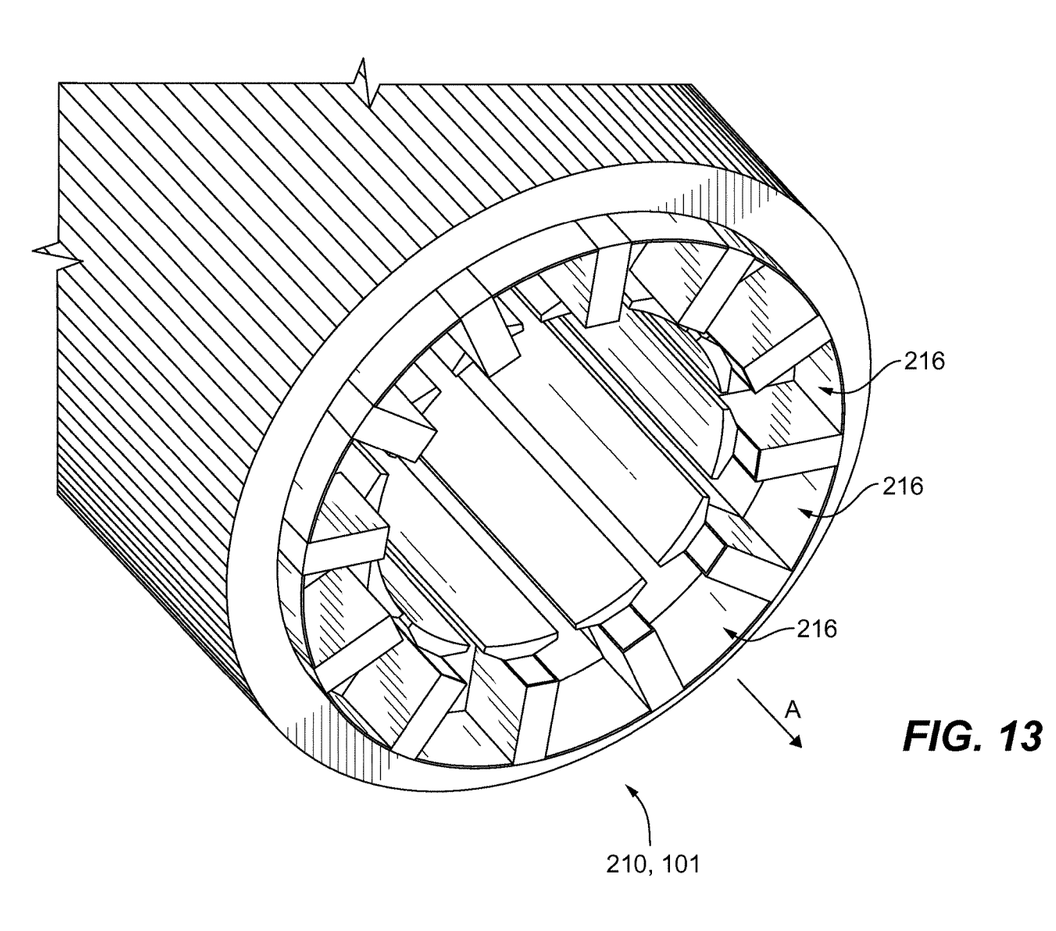
FIG. 13 is a perspective view of the end slot insulator and stator core of FIG. 12, showing the end slot insulator assembled onto the stator core.

With reference now to FIG. 11, another exemplary embodiment of a slot insulator 210 is shown, which is in the form of a complete ring. Individual slot liners 214, only four of which are labeled in FIG. 11 for sake of clarity, can be seated in end slots of stator 101, as indicated in FIGS. 12 and 13. A winding slot 216 is defined through each slot liner 214 in an axial direction A. An optional inner ring 215 is indicated with dashed lines in FIG. 11, which if included provides a complete perimeter, much like perimeter 126 described above, in each slot liner 214 about its respective winding slot 216. Those skilled in the art will readily appreciate that inner ring 215 is optional in slot insulator 210, and that it is also optional to have a complete perimeter 126 in slot insulator 110 described above, which could for example be left open on the radially inner perimeter. End windings 112, e.g., end winding 112a in FIG. 6, can pass through the winding slots 216, much as described above with respect to slot insulator 210. Slot insulator 210 includes a span portion 222 bridging across the gap G to connect the first and second adjacent slot liners 214. Span portion 222 can optionally be contoured as described above. For example, as shown in FIG. 11, span portion 222 includes a flat surface 224 that can optionally be curved instead, in a direction as surface 124 in FIG. 3.

The mechanical rigidity of slot insulators 110, 210 improves the mechanical support of end windings compared to traditional techniques, which tend to employ paper linings in winding slots. This added reliability means slot insulators 110, 210 provide improved electrical insulation between end windings as well as between the windings and the core itself compared to traditional techniques. Slot insulators 110, 210 also protect end windings better than traditional systems due to the improvement in heat transfer from the end windings to the core. Improved heat transfer, electrical insulation, and mechanical support provide for longer useful life in electrical machines.

While shown and described in the exemplary context of a stator with inward facing winding slots, those skilled in the art will readily appreciate that rotors and/or cores with outward facing winding slots can also be used without departing from the scope of this disclosure. Moreover, those skilled in the art will readily appreciate that the systems and techniques disclosed herein can be applied to any suitable type of electrical machine, including motors, generators, and electrical machines that are used as both generators and motors, such as in starter motor/generators for gas turbine engines.

The methods and systems of the present disclosure, as described above and shown in the drawings, provide for electrical machines with superior properties including improved mechanical rigidity, electrical insulation and heat transfer for end windings. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A slot insulator for an electrical machine comprising:
   a first slot liner with a winding slot defined therethrough in an axial direction;
   a second slot liner with a winding slot defined therethrough in the axial direction, wherein the second slot liner is spaced apart in a lateral direction relative to the axial direction from the first slot liner by a gap; and
   a span portion bridging across the gap to connect the first and second slot liners, wherein the span portion includes a material different than that of the first and second slot liners, wherein the material of the span portion has a higher thermal conductivity than that of the first and second slot liners.

2. An electrical machine comprising:
   a winding core with a plurality of end slots;
   a winding seated in the end slots with end windings where the winding crosses from end slot to end slot; and
   a slot insulator seated in two of the end slots including:
   a first slot liner seated in a first one of the two end slots with a winding slot defined therethrough in an axial direction, wherein one of the end windings enters the first one of the end slots through the winding slot of the first slot liner;
   a second slot liner seated in a second one of the two end slots with a winding slot defined therethrough in the axial direction, wherein the second slot liner is spaced apart in a lateral direction relative to the axial direction from the first slot liner by a gap, wherein one of the end windings exits the second one of the end slots through the winding slot of the second slot liner; and
   a span portion bridging across the gap to connect the first and second slot liners, wherein the span portion includes a material different than that of the first and second slot liners, wherein the material of the span portion has a higher thermal conductivity than that of the first and second slot liners.

* * * * *